(12) United States Patent
Liu (10) Patent No.: US 11,621,454 B2
(45) Date of Patent: Apr. 4, 2023

(54) BATTERY ASSEMBLY

(71) Applicant: Darfon Electronics Corp., Taoyuan (TW)

(72) Inventor: Chih-Hsien Liu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 222 days.

(21) Appl. No.: 17/169,599

(22) Filed: Feb. 8, 2021

(65) Prior Publication Data

US 2022/0037730 A1 Feb. 3, 2022

(30) Foreign Application Priority Data

Jul. 31, 2020 (TW) .................. 109126101

(51) Int. Cl.
*H01M 50/244* (2021.01)
*H01M 50/264* (2021.01)

(52) U.S. Cl.
CPC ....... *H01M 50/244* (2021.01); *H01M 50/264* (2021.01)

(58) Field of Classification Search
CPC ............. H01M 50/244; H01M 50/264; H01M 2220/20; H01M 50/262; B62H 5/001; B62J 43/13; B62J 43/23; B62M 6/90
See application file for complete search history.

(56) References Cited

U.S. PATENT DOCUMENTS

| | | | |
|---|---|---|---|
| 9,611,003 B1 | 4/2017 | Yu et al. | |
| 10,170,737 B2 | 1/2019 | Shimoda et al. | |
| 11,021,212 B2 | 6/2021 | Shimoda et al. | |
| 2009/0256328 A1* | 10/2009 | Dudding | B60G 11/113 267/52 |
| 2009/0261134 A1 | 10/2009 | Tetsuka et al. | |

(Continued)

FOREIGN PATENT DOCUMENTS

| | | |
|---|---|---|
| CN | 201994358 U | 9/2011 |
| CN | 107546348 A | 1/2018 |

(Continued)

OTHER PUBLICATIONS

Machine English translation of DE 102019104238 (Year: 2019).*

(Continued)

*Primary Examiner* — Michael L Dignan
(74) *Attorney, Agent, or Firm* — McClure, Qualey & Rodack, LLP (57) ABSTRACT

A battery assembly includes a battery holding unit and a battery unit removably held by the battery holding unit. The battery unit includes a battery, a first engaging portion and a second engaging portion disposed on an end portion of the battery. The battery holding unit includes a holding member selectively engaging with the first engaging portion or the second engaging portion to hold the battery unit at a first position or a second position. When the holding member and the first engaging portion relatively move away from each other, the battery unit moves from the first position to the second position at which the holding member engages with the second engaging portion, and the second engaging portion is allowed to rotate along a surface of the end portion to disengage from the holding member and to remove the battery unit from the battery holding unit.

12 Claims, 12 Drawing Sheets

(56) References Cited

U.S. PATENT DOCUMENTS

| | | | |
|---|---|---|---|
| 2010/0237585 A1* | 9/2010 | Binggeli | B62K 19/30 |
| | | | 280/288.4 |
| 2016/0311494 A1 | 10/2016 | Schliewert | |
| 2017/0174095 A1 | 6/2017 | Shieh | |
| 2018/0006277 A1 | 1/2018 | Shimoda et al. | |
| 2018/0006278 A1* | 1/2018 | Shimoda | H01M 50/202 |
| 2019/0165347 A1* | 5/2019 | Trif | H01M 50/20 |
| 2022/0161891 A1* | 5/2022 | Bock | B62K 19/30 |

FOREIGN PATENT DOCUMENTS

| | | | | |
|---|---|---|---|---|
| CN | 107565070 A | | 1/2018 | |
| CN | 208056874 U | | 11/2018 | |
| CN | 110126968 A | | 8/2019 | |
| CN | 110197879 A | | 9/2019 | |
| DE | 102016213903 B3 | | 1/2018 | |
| DE | 102017005434 A1 | | 1/2018 | |
| DE | 102018006690 A1 | | 2/2019 | |
| DE | 102019104238 | * | 8/2019 | B62M 6/90 |
| DE | 102019104238 A1 | | 8/2019 | |
| JP | 2002117818 A | | 4/2002 | |
| JP | 2003134639 A | | 5/2003 | |
| JP | 2006049194 A | | 2/2006 | |
| JP | 2022117818 A | | 8/2022 | |
| TW | M458338 U | | 8/2013 | |
| TW | M514946 U | | 1/2016 | |
| TW | 201607112 A | | 2/2016 | |
| TW | M525556 U | | 7/2016 | |
| TW | M580538 U | | 7/2019 | |
| TW | M598532 U | | 7/2020 | |
| WO | 2018019441 A1 | | 2/2018 | |
| WO | 2019167787 A1 | | 9/2019 | |

OTHER PUBLICATIONS

Netherlands Office Action dated Jan. 5, 2022 in application No. 141280.

Non-Final Office Action issued in U.S. Appl. No. 16/808,029, filed Mar. 3, 2020, dated Oct. 8, 2021.

TW Office Action dated Jul. 6, 2021 in Taiwan application (No. 109126101).

CN Office Action dated Sep. 5, 2022 in Chinese application No. 201911128581.6.

* cited by examiner

BATTERY ASSEMBLY

BACKGROUND OF THE INVENTION

1. Field of the Invention

The invention generally relates to a battery assembly. Particularly, the invention relates to a battery assembly with a two-stage engaging mechanism.

2. Description of the Prior Art

Electric bicycles generally utilize batteries as the power source for motors, and the battery is usually mounted on the bicycle frame. In order to prevent the battery from falling off the bicycle frame, locking mechanism is generally provided to secure the battery. However, when the battery is to be replaced or removed, users generally have to hold the battery by one hand and release the locking mechanism by the other hand. Consequently, when the locking mechanism is unlocked by one hand, and the other hand cannot immediately support the battery, the battery will directly fall off the bicycle frame, resulting in high potential of damaging the battery and inconvenience of operation.

SUMMARY OF THE INVENTION

It is an object of the invention to provide a battery assembly with a two-stage engaging mechanism to prevent the battery unit from directly disengaging from the battery holding unit as the battery unit is to be removed.

It is another object of the invention to provide a battery assembly, which has the engaging portion rotatably along the end surface of the battery to reduce the space required for the engaging mechanism between the battery unit and the battery holding unit.

In an embodiment, the invention provides a battery assembly including a battery holding unit and a battery unit removably held by the battery holding unit. The battery unit includes a battery, a first engaging portion, and a second engaging portion. The first engaging portion and the second engaging portion are disposed on an end portion of the battery. The second engaging portion is rotatable along a surface of the end portion. The battery holding unit includes a holding member configured to engage with the first engaging portion to hold the battery unit at a first position or to engage with the second engaging portion to hold the battery unit at a second position. When the holding member and the first engaging portion relatively move away from each other along a disengagement direction, the battery unit moves along a detachment direction from the first position to the second position at which the holding member engages with the second engaging portion, and the second engaging portion is allowed to rotate along the surface of the end portion to disengage from the holding member, so that the battery unit moves again along the detachment direction to be removed from the battery holding unit.

In an embodiment, the battery assembly further includes a lock device. The lock device is disposed on the battery holding unit to couple with the holding member. When the lock device is in a locked state, the holding member and first engaging portion are immovable relative to each other to maintain engaging with each other. When the lock device is changed to an unlocked state, the holding member moves along the disengagement direction to disengage from the first engaging portion.

In an embodiment, the battery unit includes a movable member. The second engaging portion is disposed at one end of the movable member. An operation portion is disposed at the other end of the movable member opposite to the second engaging portion. The operation portion is operated to rotate the movable member, so that the second engaging portion moves away from the holding member to disengage from the holding member.

In an embodiment, the battery unit further includes a positioning portion disposed on the end portion, and the movable member is rotatable positioned on the positioning portion.

In an embodiment, the battery unit further includes a torsion spring positioned between the positioning portion and the movable member, so that when no external force is exerted on the operation portion, the second engaging portion is maintained close to the first engaging portion. When an external force is exerted on the operation portion, the second engaging portion rotates away from the first engaging portion.

In an embodiment, the battery unit has a positioning hole on the end portion. A first extension end of the torsion spring is inserted into the positioning hole, and a second extension end of the torsion spring interferes with the end portion.

In an embodiment, the battery unit has a restriction portion disposed on the end portion. When the movable member rotates, the restriction portion restricts rotation of the movable member.

In an embodiment, the restriction portion is an angular block with two adjacent sides. When the movable member is positioned on the positioning portion, the movable member covers the angular block.

In an embodiment, the battery unit further includes a protrusion portion disposed on the end portion. The protrusion portion protrudes toward the battery holding unit to define a space for accommodating the second engaging portion on the end portion.

In an embodiment, the battery unit further includes a cushion member disposed on the protrusion portion and configured to contact the battery holding unit.

In an embodiment, the battery assembly further includes a resilient member disposed on the battery holding unit. When the engaging member disengages from the first engaging portion or the second engaging portion, the resilient member provides a restoring force to push the battery unit to move along the detachment direction.

In an embodiment, the battery assembly further includes a bracket and a pad. The battery holding unit is mounted on the bracket, and the pad is disposed between the bracket and the resilient member to define a distance between the battery holding unit and the bracket.

Compared with the prior art, the battery assembly of the invention has a two-stage engaging mechanism between the battery unit and the battery holding unit, not only to enhance the holding effect between the battery unit and the battery holding unit, but also to provide the user sufficient time to release the second-stage engagement of the battery unit and the battery holding unit after the first-stage engagement is released. Consequently, the battery assembly of the invention can effectively prevent the battery unit from directly falling off to reduce the chance of damaging the battery unit and to improve the operation convenience. Moreover, the battery assembly of the invention can reduce the space for the engaging mechanism between the battery unit and the battery holding unit by disposing the engaging portion rotatable along the end surface.

DETAILED DESCRIPTION OF THE PREFERRED EMBODIMENT

The invention provides a battery assembly, which can be applied to an electric bicycle, but not limited thereto. The battery assembly of the invention can be applied to any suitable device, which requires a two-stage engaging mechanism, to provide safe and convenient operations of the battery assembly. Hereinafter, the structure and operation of elements of the battery assembly of the invention will be described in detail with reference to the drawings.

Figure 1:
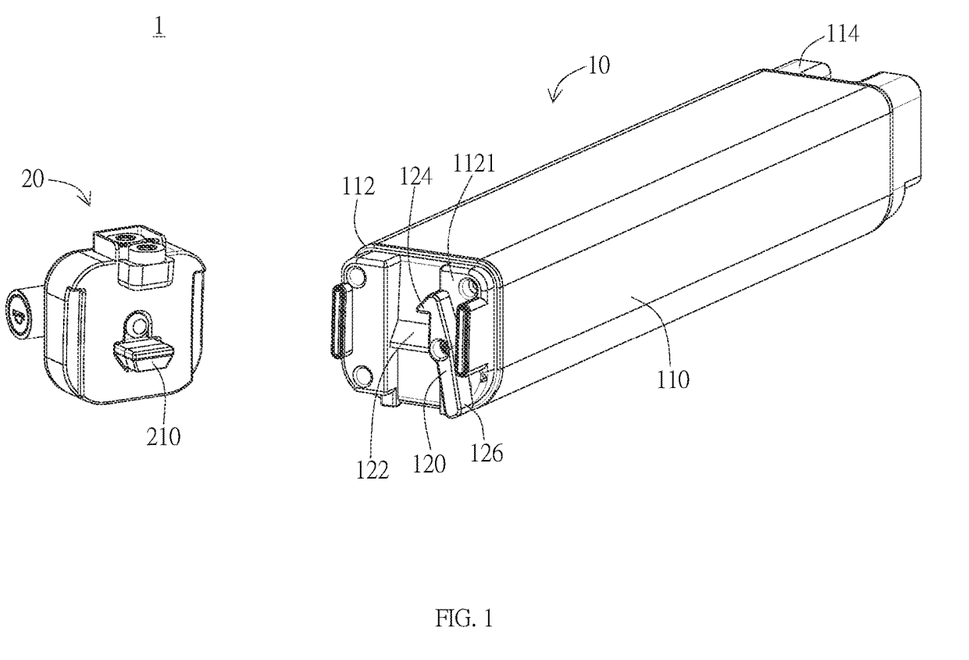
FIG. 1 is a schematic view of the battery assembly in an embodiment of the invention.

FIG. 1 is a schematic view of the battery assembly in an embodiment of the invention. As shown in FIG. 1, the battery assembly 1 includes a battery unit 10 and a battery holding unit 20. The battery unit 10 is removably held by the battery holding unit 20. The battery unit 10 includes a battery 110, a first engaging portion 122, and a second engaging portion 124. The first engaging portion 122 and the second engaging portion 124 are disposed on an end portion 112 of the battery 110, and the second engaging portion 124 is rotatable along the surface 1121 of the end portion 112. The battery holding unit 20 includes a holding member 210. The holding member 210 is configured to engage with the first engaging portion 122 to hold the battery unit 10 at a first position or to engage with the second engaging portion 124 to hold the battery unit 10 at a second position to form a two-stage engaging mechanism. When the holding member 210 and the first engaging portion 122 relatively move away from each other along a disengagement direction D1 (shown in FIG. 3), the battery unit 10 moves along a detachment direction D2 (shown in FIG. 2) from the first position to the second position at which the holding member 210 engages with the second engaging portion 124, and the second engaging portion 124 is allowed to rotate along the surface 1121 of the end portion 112 to disengage from the holding member 210, so that the battery unit 10 moves again along the detachment direction D2 to be removed from the battery holding unit 20.

Figure 2:
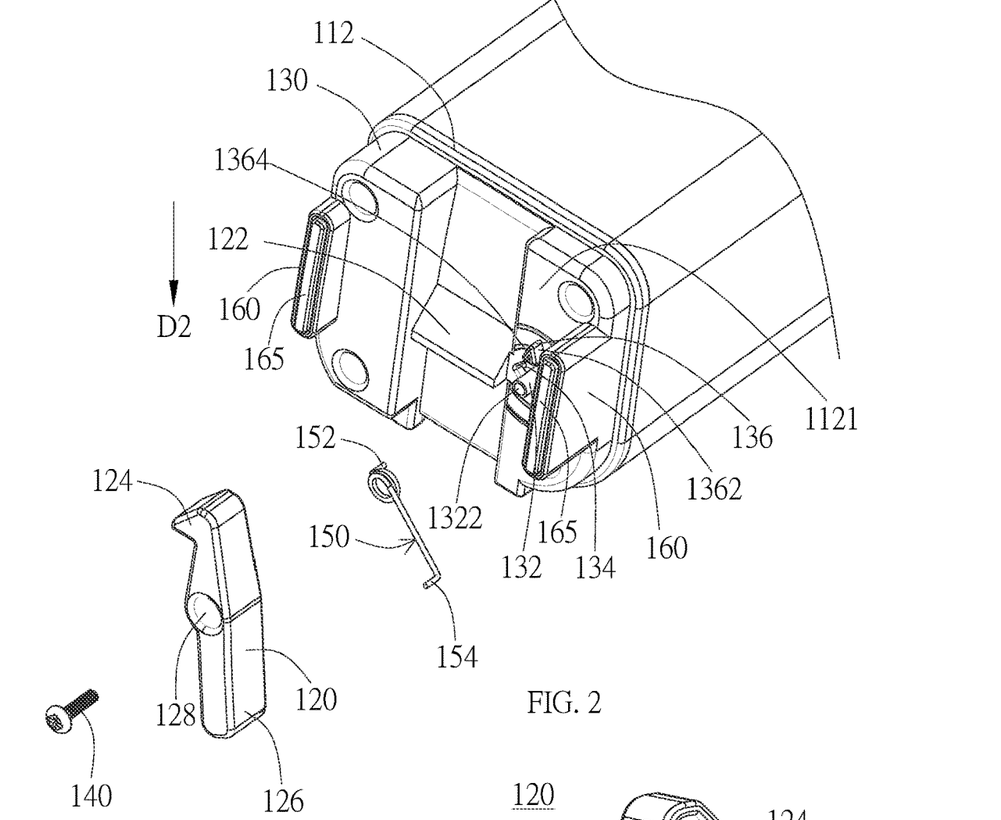
FIG. 2 is a partially enlarged exploded view of the battery unit of FIG. 1.

Referring FIG. 1 and FIG. 2, FIG. 2 is a partially enlarged exploded view of the battery unit of FIG. 1. The battery 110 has two end portions 112 and 114 at two opposite sides in the longitudinal direction. The end portion 112 is adjacent to the battery holding unit 20, and the end portion 114 is away from the battery holding unit 20. The surface 1121 is the surface of the end portion 112 that faces the battery holding unit 20. In an embodiment, the battery 110 can be provided with a battery cap 130 at the end portion 112, and the surface 1121 can be the surface of the battery cap 130 that faces the battery holding unit 20. In this embodiment, the first engaging portion 122 and the second engaging portion 124 are two separate components. For example, the first engaging portion 122 can be a hook portion or an engaging surface formed on the battery cap 130, and the second engaging portion 124 is a component rotatably disposed on the battery cap 130.

In an embodiment, the battery unit 10 includes a movable member 120. The second engaging portion 124 is disposed at one end of the movable member 120, and an operation portion 126 is disposed at the other end of the movable member 120 opposite to the second engaging portion 124. The operation portion 126 can be operated under an external force to rotate the movable member 120, so that the second engaging portion 124 moves away from the holding member 210 to disengage from the holding member 210. Specifically, the movable member 120 is rotatably disposed on the end portion 112, so that the movable member 120 can rotate parallel to the surface 1121. In other words, the rotation axis of the movable member 120 is substantially parallel to the normal to the surface 1121 or perpendicular to the surface 1121. The second engaging portion 124 can be a hook like portion on one end of the movable member 120. The rotation axis of the movable member 120 is preferably between the second engaging portion 124 and the operation portion 126, and the operation portion 126 is a rod or block extending from the rotation axis along a direction away from the second engaging portion 124. In an embodiment, the second engaging portion 124 can be inclined with respect to the operation portion 126. In other words, the second engaging portion 124 includes an angle smaller than 180 degrees with the operation portion 126. For example, the movable member 120 can be an arched bar, and the second engaging portion 124 is bent toward the first engaging portion 122, so that the rotation space for the second engaging portion 124 to disengage from (or engage with) the holding member 210 can be reduced, but not limited thereto. According to practical applications, the movable member 120 can have any suitable shape. For example, in another embodiment, the movable member 120 can be a linear bar. The second engaging portion 124 and the operation portion 126 are preferably disposed on two opposite sides with respect to the rotation axis of the movable member 120, so that when the operation portion 126 is driven by the external force to make the movable member 120 rotate, the second engaging portion 124 correspondingly rotates along with the movable member 120. In other words, the rotation directions of the operation portion 126, which is operated under the external force, and the second engaging portion 124 are the same, and the displacement directions of the operation portion 126 and the second engaging portion 124 are different.

A pivot mechanism is provided between the end portion 112 and the movable member 120, so that the movable member 120 is rotatably connected to the end portion 112 to be rotatable along the surface 1121 of the end portion 112. In an embodiment, the battery unit 10 further includes a positioning portion 132 disposed on the end portion 112. The movable member 120 is rotatably positioned on the positioning portion 132. For example, the positioning portion 132 can be a post, which protrudes from the battery cap 130 and has a screw hole 1322. The movable member 120 has a through hole 128 corresponding to the positioning portion 132, so that the movable member 120 can be sleeved on the positioning portion 132 by the through hole 128, and a screw 140 is secured to the screw hole 1322 via the through hole 128. As such, the movable member 120 is rotatably positioned on the positioning portion 132. In such a configuration, the positioning portion 132 can be considered as the rotation axis of the movable member 120 when the movable member 120 rotates along the surface 1121, but not limited thereto. In another embodiment (not shown), the battery unit 10 may not have the positioning portion 132, and the surface 1121 can be directly formed with the screw hole 1322, so that the screw 140 is secured to the screw hole 1322 via the through hole 128 to position the movable member 120 on the surface 1211, and the screw 140 can be considered as the rotation axis of the movable member 120 when the movable member 120 rotates along the surface 1121.

The positioning portion 132 is preferably located at the lateral side of the first engaging portion 122 with respect to the detachment direction D2, so that when the movable member 120 is positioned on the positioning portion 132, the second engaging portion 124, the first engaging portion 122, and the operation portion 126 are sequentially disposed along the detachment direction D2 along which the battery unit 10 leaves the battery holding unit 20. In other words, the second engaging portion 124, the first engaging portion 122, and the operation portion 126 are located at the upstream, the middle stream, and the downstream along the detachment direction D2, respectively. For example, when the detachment direction D2 is a downward direction, the second engaging portion 124, the first engaging portion 122, and the operation portion 126 are sequentially disposed from top to bottom. The operation portion 126 is operated under a force to drive the movable member 120 to rotate. For example, the operation portion 126 is pushed by the user to enable the movable member 120 to rotate, so that the second engaging portion 124 correspondingly moves away from the holding member 210. In the detachment direction D2, the second engaging portion 124 is at least partially located outside the first engaging portion 122, and in the disengagement direction D1, the second engaging portion 124 is closer to the battery holding unit 20 than the first engaging portion 122.

In an embodiment, the battery unit 10 further includes a torsion spring 150. The torsion spring 150 is positioned between the positioning portion 132 and the movable member 120, so that when no external force is exerted on the operation portion 126, the second engaging portion 124 is maintained close to the first engaging portion 122. When the operation portion 126 is operated under the external force, the second engaging portion 124 rotates away from the first engaging portion 122. In an embodiment, as shown in FIG. 2, the battery unit 10 has a positioning hole 134 on the end portion 112. The torsion spring 150 is positioned on the positioning portion 132 at the end portion 112 of the battery 110, so that a first extending end 152 of the torsion spring 150 is inserted into the positioning hole 134, and a second extending end 154 of the torsion spring 150 interferes with the end portion 112 (e.g. the protrusion portion 160, described later). The torsion spring 150 provides an elastic force to enable the second engaging portion 124 to be maintained closer to first engaging portion 122, i.e. be maintained at a position capable of interfering with the engaging member 210.

Figure 2A:
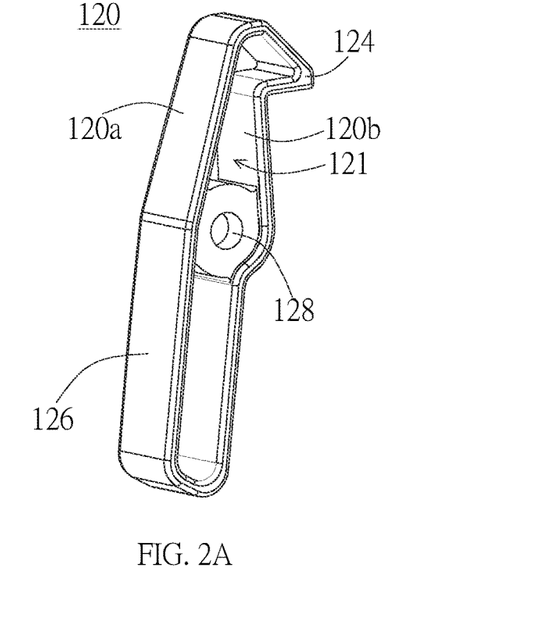
FIG. 2A is a schematic view of the movable member of FIG. 2 from a different viewing angle.

In an embodiment, the battery unit 10 has a restriction portion 136 disposed on the end portion 112. When the movable member 120 rotates, the restriction portion 136 restricts rotation of the movable member 120. Specifically, as shown in FIG. 2, the restriction portion 136 can be an angular block with two adjacent sides 1362 and 1364, and the restriction portion 136 is preferably adjacent to the positioning portion 132. When the movable member 120 is positioned on the positioning portion 132, the movable member 120 covers the angular block (e.g. the restriction portion 136). For example, as shown in FIG. 2A, the movable member 120 has a receiving space 121 at the side facing the end portion 112. When the movable member 120 is positioned on the positioning portion 132, the restriction portion 136 is received in the receiving space 121. When the movable member 120 rotates along the surface 1121, two sidewalls 120a and 120b of the movable member 120 at two opposite sides with respect to the receiving space 121 can selectively interfere with the two sides 1362 and 1364 of the restriction portion 136, so as to restrict the rotation range of the movable member 120, but not limited thereto. In another embodiment (not shown), the restriction portion can be blocks disposed on the surface 1121 outside the two sidewalls 120a and 120b of the movable member 120, so that the movable member 120 is restricted to rotate between the two blocks, and the rotation range of the movable member 120 is defined by the two blocks.

In an embodiment, the battery unit 10 further includes a protrusion portion 160 disposed on the end portion 112. The protrusion portion 160 protrudes toward the battery holding unit 20 to define a space for accommodating the second engaging portion 124 on the end portion 112. For example, two columns extend from two opposite sides of the battery cap 130 toward the battery holding unit 20 to serve as the protrusion portions 160, so that when the second engaging portion 124 is disposed on the end portion 112, the second engaging portion 124 preferably does not extend beyond the protrusion portion 160 in the direction perpendicular to the surface 1121. In other words, the protrusion portion 160 can be the portion of the battery unit 10 that is configured to contact the battery holding unit 20. In addition, in this embodiment, the protrusion portion 160 can also be the portion that interferes with the second extending end 154 of the torsion spring 150. For example, the second extending end 154 of the torsion spring 150 abuts against the lower side of the protrusion portion 160, so that the torsion spring 150 provides the force to make the second engaging portion 124 be maintained at the position close to the first engaging portion 122. In an embodiment, the battery unit 10 can further include a cushion member 165, which is disposed on the protrusion portion 160 and configured to contact the battery holding unit 20. For example, the cushion member 165 can include elastic materials, such as rubber or polymers, so that the cushion member 165 can absorb the impact force when the battery unit 10 contacts the battery holding unit 20 or increase the tightness of connection and the fiction between the battery unit 10 and the battery holding unit 20 to slow down the moving speed of the battery unit 10 relative to the battery holding unit 20.

Figure 3:
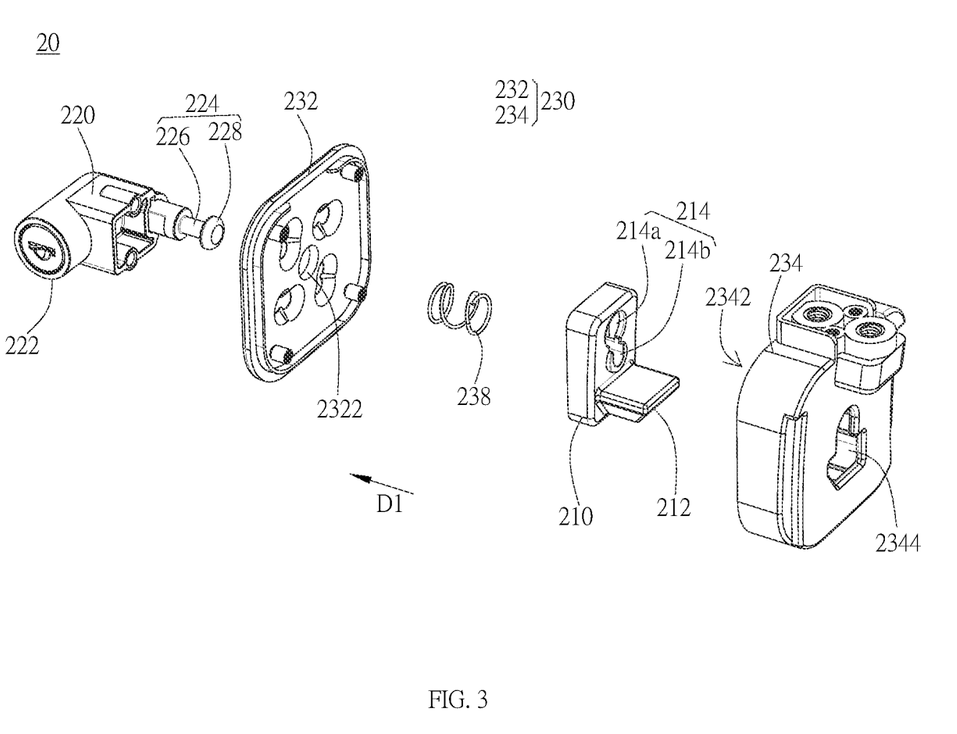
FIG. 3 is an exploded view of the battery holding unit of FIG. 1.

Referring to FIG. 1 and FIG. 3, FIG. 3 is an exploded view of the battery holding unit of FIG. 1. In an embodiment, the battery holding unit 20 may further include a lock device 220, a base 230, and a resilient member 238. The lock device 220 is disposed on the battery holding unit 20 to couple with the holding member 210. Specifically, the lock device 220 and the holding member 210 are disposed on two opposite sides of the base 230, and the resilient member 238 is disposed between the lock device 220 and the holding member 210. In response to the locked state or the unlocked state of the lock device 220, the holding member 210 is restricted or allowed to move along the disengagement direction D1. For example, when the lock device 220 is in the locked state, the holding member 210 and the first engaging portion 122 are immovable relative to each other along the disengagement direction D1 to maintain engaging with each other. When the lock device 220 is changed to the unlocked state, the holding member 210 is driven to move along the disengagement direction D1 to disengage from the first engaging portion 122.

The holding member 210 has an interfering portion 212. The interfering portion 212 protrudes outward, i.e., toward the battery unit 10. The interfering portion 212 can have a hook-like configuration corresponding to the first engaging portion 122 and the second engaging portion 124 to engage with the first engaging portion 122 or the second engaging portion 124. The holding member 210 further has a coupling hole 214, which is configured to couple the lock device 220. In an embodiment, the coupling hole 214 includes a first hole portion 214*a* and a second hole portion 214*b*, which communicate with each other. The diameter of the first hole portion 214*a* is larger than that of the second hole portion 214*b*, so that the coupling hole 214 has a gourd shape.

The lock device 220 includes a lock body 222 and a linking shaft 224. The linking shaft 224 is connected to the lock body 222, and in response to the locked state and the unlocked state of the lock body 222, the linking shaft 224 extends or retreats relative to the lock body 222. In other words, the linking shaft 224 extends or retreats along the disengagement direction D1. For example, the lock body 222 may be a key lock or a combination lock, which is set at the locked state or the unlocked state by means of the key or the pin number. When the lock body 222 is in the locked state, the linking shaft 224 extends relative to the lock body 222. When the lock body 222 is in the unlocked state, the linking shaft 224 retreats relative to the lock body 222. In other words, the length of the linking shaft 224 in the extending state with respect to the lock body 222 is larger than the length of the linking shaft 224 in the retreating state with respect to the lock body 222. In an embodiment, the linking shaft 224 includes a neck section 226 and a head section 228 along the longitudinal direction (or the extending or retreating direction). In a direction perpendicular to the longitudinal direction, such as a radial direction, the neck section 226 has a width (or diameter) smaller than that of the head section 228. In other words, the neck section 226 is shrunk inward with respect to the head section 228.

The base 230 is preferably a hollow housing and configured to allow the holding member 210 to move in the base 230 relatively. In an embodiment, the base 230 includes a side board 232 and a base body 234. The base body 234 is a frame body having an accommodation space 2342 therein, and the side board 232 is disposed at the open side of the base body 234 with respect to the accommodation space 2342, so that the side board 232 and the based body 234 together constitute a housing with the accommodation space 2342 enclosed therein. The side board 232 can be connected to the base body 234 by screwing, engaging, adhering, or welding, but not limited thereto. The side board 232 is neighboring the lock device 220 and has a through hole 2322. The base 234 has an opening 2344. The through hole 2322 and the opening 2344 communicate with the accommodation space 2342. The size of the through hole 2322 preferably corresponds to the linking shaft 224 to allow the linking shaft 224 to pass therethrough, and the size of the opening 2344 corresponds to the holding member 210 to allow the interfering portion 212 to extend outward or retreat inward.

The lock device 220 is disposed at the outer side of the side board 232, and the linking shaft 224 is inserted into the accommodation space 2342 from the through hole 2322. The resilient member 238 (e.g. coil spring) is disposed between the side board 232 and the holding member 210 and is sleeved on the linking shaft 224. The size of the first hole portion 214*a* corresponds to the head section 228 of the linking shaft 224, and the size of the second hole portion 214*b* corresponds to the neck section 226. As such, the linking shaft 224 is inserted into the coupling hole 214 via the first hole portion 214*a* to position the head section 228 at the holding member 210 neighboring the base 234 and to position the neck section 226 within the first hole portion 214*a*. During assembling, the linking shaft 224 is moved from the first hole portion 214*a* to the second hole portion 214*b*, so that the neck section 226 is engaged with the second dhole portion 214*b*, and the linking shaft 224 is stably engaged with the holding member 210 to form a linking mechanism with the interfering portion 212, which is exposed at the opening 2344.

Figure 4:
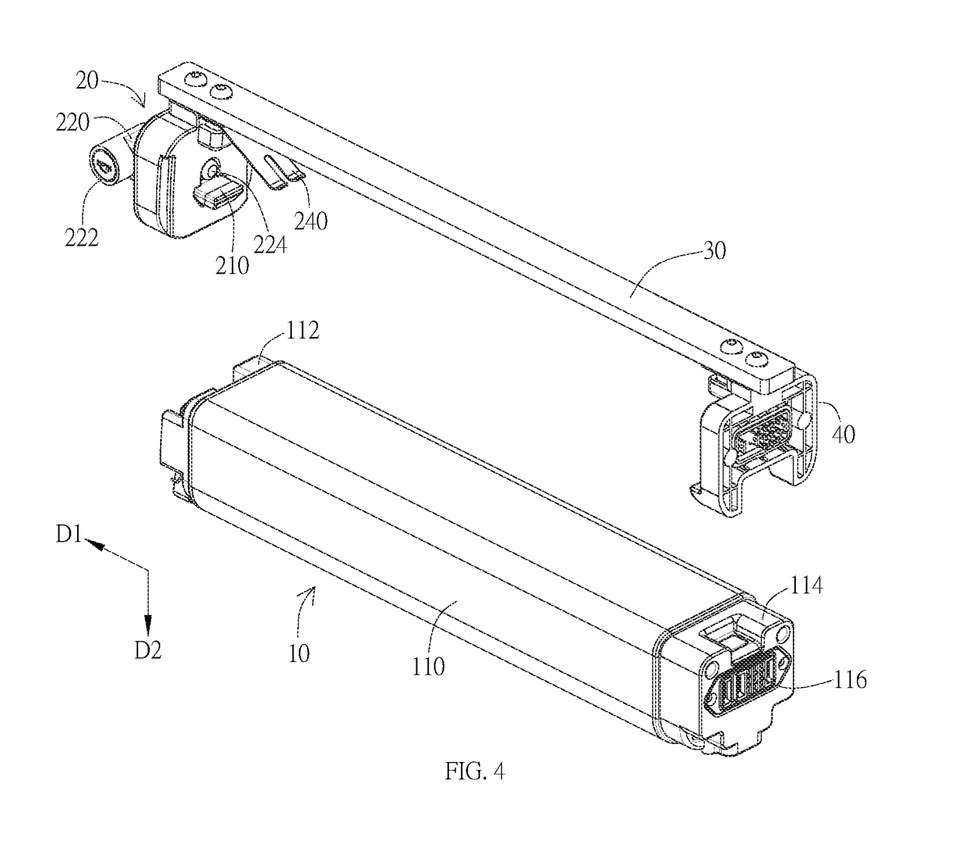
FIG. 4 is a schematic view of the battery assembly in another embodiment of the invention.
Figure 4A:
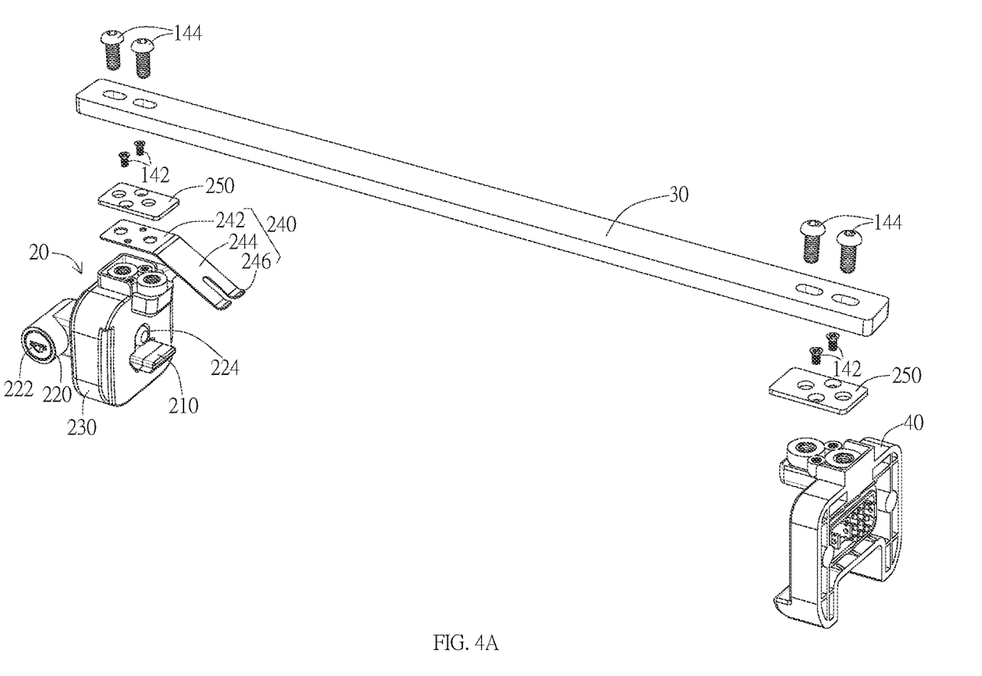
FIG. 4A is a partially exploded view of the battery holding unit of FIG. 4.

Referring to FIG. 4, FIG. 4 is a schematic view of the battery assembly in another embodiment of the invention. FIG. 4A is a partially exploded view of the battery holding unit of FIG. 4. As shown in FIG. 4 and FIG. 4A, the battery assembly 1 further includes a resilient member 240 disposed on the battery holding unit 20. When the engaging member 210 disengages from the first engaging portion 122 or the second engaging portion 124, the resilient member 240 provides a restoring force to push the battery unit 10 to move along the detachment direction D2. Specifically, the resilient member 240 can be a leaf spring and can be mounted on the base 230 of the battery holding unit 20 by screwing, engaging, etc. For example, the resilient member 240 has a connection portion 242, an extension portion 244, and a contacting portion 246. The connection portion 242 is connected to the battery holding unit 20. The extension portion 244 extends from the connection portion 242 toward the detachment direction D2, e.g. downward, so that the angle included between the extension portion 244 and the connection portion 242 is smaller than 180 degrees. The extending length of the extension portion 244 and the bending angle of the extension portion 244 with respect to the connection portion 242 can be modified according to the distance between the battery 110 and the connection portion 242 when the battery unit 10 is maintained at the first position and the restoring force of the resilient member 240 to be exerted on the battery 110. The distal end of the extension portion 244 (i.e., the end away from the connection portion 242) is preferably bent to form the contacting portion 246 to increase the contact stability when the contacting portion 246 contacts the battery unit 10, but not limited thereto. In another embodiment, the distal end of the extension portion 244 may not be a bending portion, and the contacting portion 246 can be the free end of the extension portion 244, which contacts the battery unit 10.

Moreover, the battery assembly 1 can further include a bracket 30 and a pad 250. The battery holding unit 20 is mounted on the bracket 30, and the pad 250 is disposed between the bracket 30 and the resilient member 240 to define a distance between the battery holding unit 20 and the bracket 30. In an embodiment, the bracket 30 can be a component of the battery assembly 1, so that the battery assembly 1 can be mounted on the bicycle frame by the bracket 30. The pad 250 is used to adjust the distance between the battery holding unit 20 and the bracket 30 to meet the space requirements of different frame designs without the need to redesign and change the size of the base 230. In another embodiment, the bracket 30 can be a part of the bicycle frame, and the distance between the bicycle frame and the battery holding unit 20 can be adjusted by selecting a suitable pad 250 according to practical applications. In addition, the connector 40 of the electric bicycle can be disposed on the bracket 30 opposite to the battery holding unit 20, so that the distance between the connector 40 and the battery holding unit 20 is substantially equal to the length of the battery unit 10 along the longitudinal direction. When the battery unit 10 is held by the battery holding unit 20 at the first position, the contacts 116 at the end portion 114 of the battery 110 of the battery unit 10 can be electrically connected to the contacts 42 of the connector 40 (shown in FIG. 5), and the cushion member 165 enhances the connection tightness, so that the battery unit 10 can stably supply power to the motor of the electric bicycle. As shown in FIG. 4A, the battery holding unit 20, the resilient member 240, the pad 250, and the bracket 30 can be connected to each other by screws 142 and 144, but not limited thereto. In another embodiment, the battery holding unit 20, the resilient member 240, the pad 250, and the bracket 30 can be connected by engaging or welding.

Figure 5:
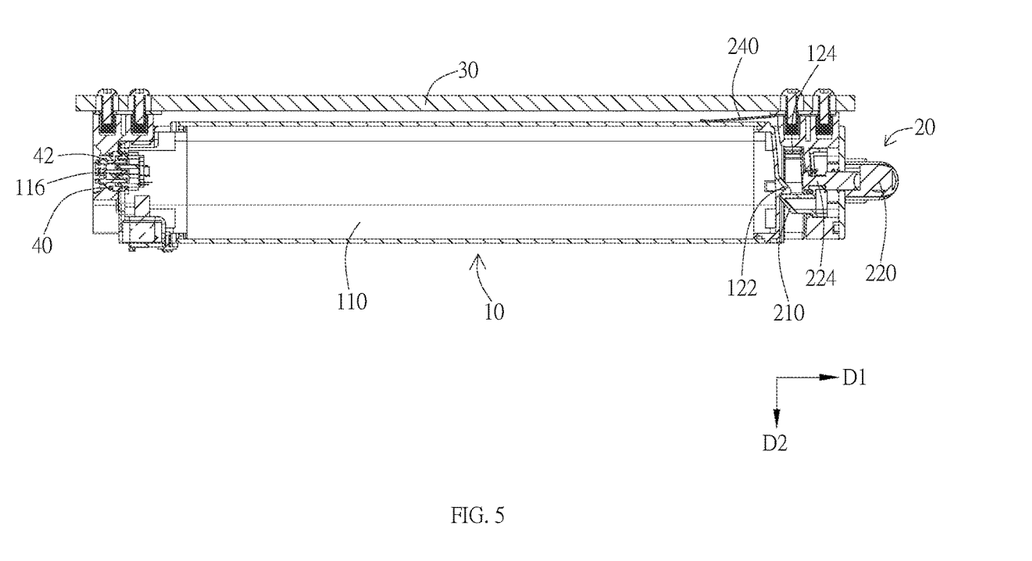
FIG. 5 is a schematic view showing the battery unit held by the battery holding unit at the first position in an embodiment of the invention.
Figure 5A:
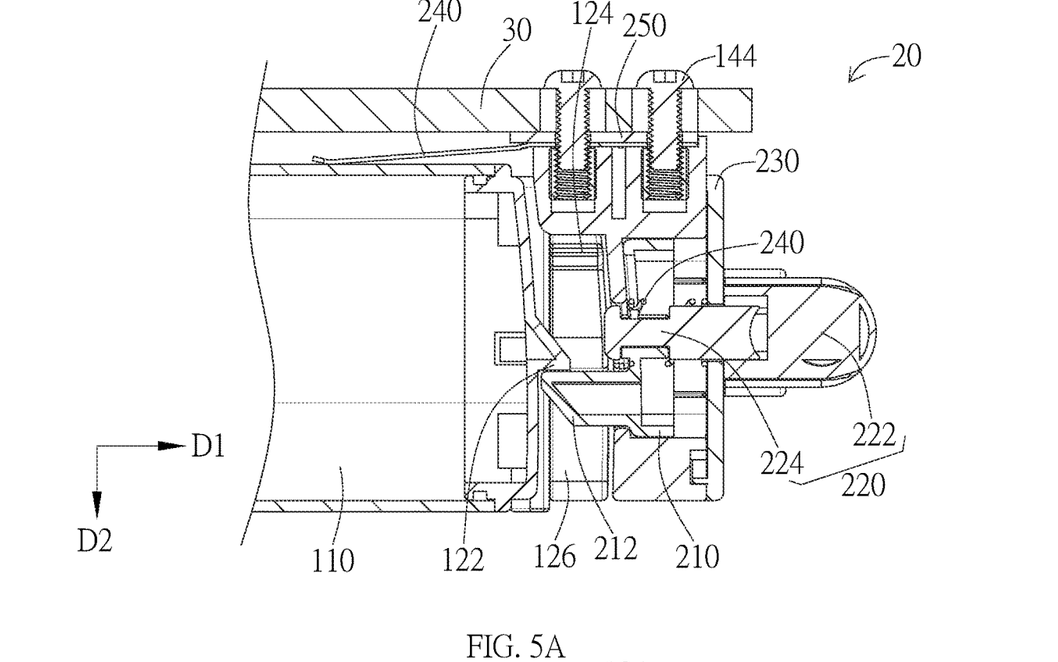
FIG. 5A is a partially enlarged view of FIG. 5.
Figure 5B:
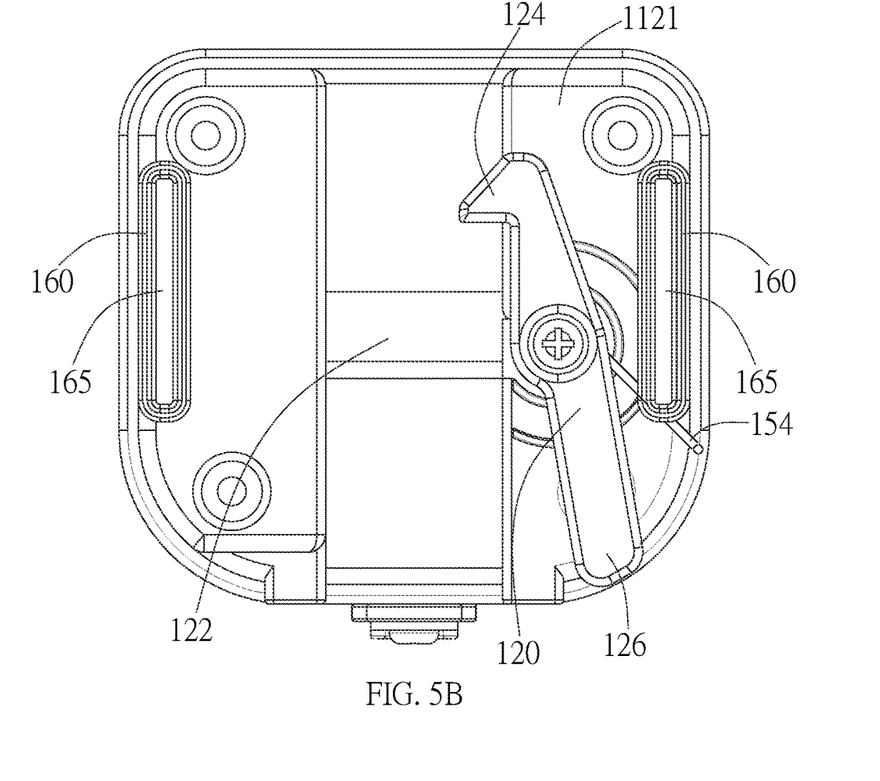
FIG. 5B is a schematic view showing the status of the second engaging portion of the battery unit of FIG. 5.
Figure 6:
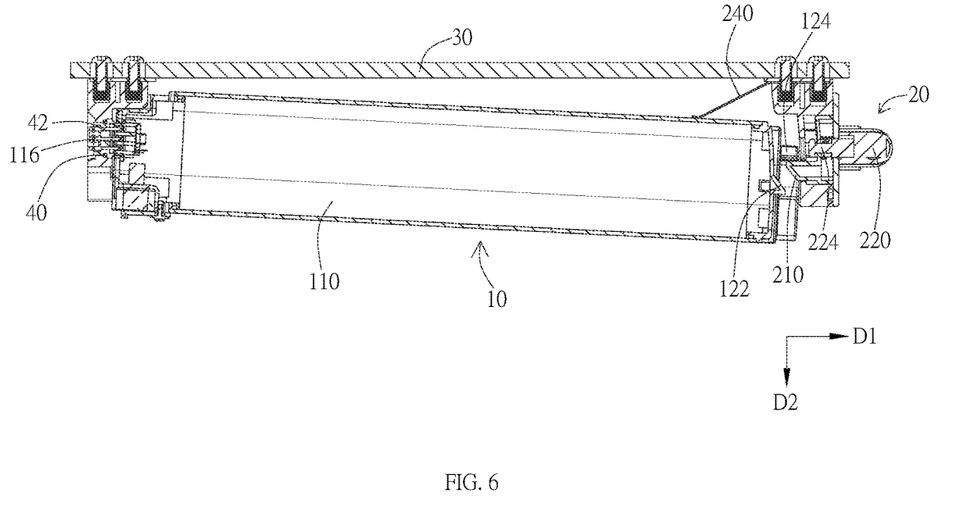
FIG. 6 is a schematic view showing the battery unit held by the battery holding unit at the second position in an embodiment of the invention.
Figure 7:
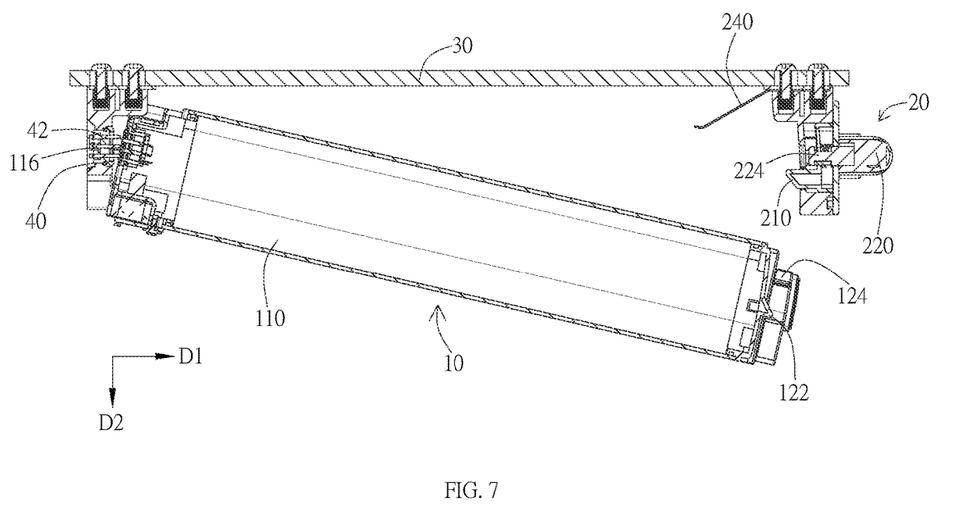
FIG. 7 is a schematic cross-sectional view showing the battery unit being removed from the battery holding unit in an embodiment of the invention.

Referring to FIG. 5 to FIG. 7, FIG. 5 and FIG. 6 are schematic cross-sectional views showing the battery unit 10 held by the battery holding unit 20 at the first position and the second position, respectively, and FIG. 7 is a schematic cross-sectional view showing the battery unit 10 being removed from the battery holding unit 20. As shown in FIG. 5 and FIG. 5A, when the holding member 210 engages with the first engaging portion 122, the battery unit 10 is held by the battery holding unit 20 at the first position. The first position is referred to a position that the battery unit 10 is combined with the battery holding unit 20 and locked by the battery holding unit 20. For example, at the first position, the lock device 220 can be operated to be in the locked or unlocked state. When the lock device 220 is in the locked state, the linking shaft 224 is in the extending state and immovable relative to the lock body 222, so that the holding member 210 and the first engaging portion 122 cannot relatively move away from each other along the disengagement direction D1 to be maintained engaging with each other, and the battery unit 10 is electrically connected to the connector 40, i.e., the contacts 116 are electrically connected to the contacts 42. In this embodiment, as shown in FIG. 5A, when the battery unit 10 is held by the battery holding unit 20 at the first position, the first engaging portion 122 engages with the interfering portion 212 along the extending direction (i.e., the disengagement direction D1) of the interfering portion 212, and the battery 110 pushes the resilient member 240 toward the bracket 30 to cause the deformation of the resilient member 240. As shown in FIG. 5A and FIG. 5B, when the battery unit 10 is held at the first position, the torsion spring 150 provides the (elastic) force to make the second engaging portion 124 be maintained at a position closer to the first engaging portion 122. In other words, the projection of the second engaging portion 124 along the detachment direction D2 is at least partially outside the first engaging portion 122 to overlap with the interfering portion 212 of the holding member 210.

Figure 6A:
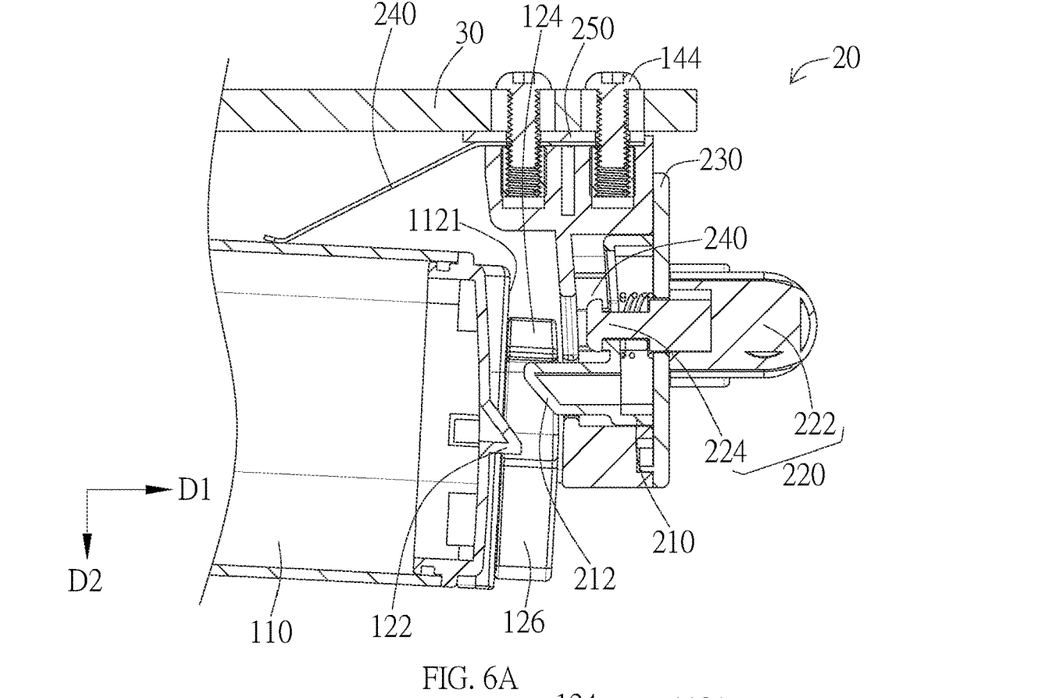
FIG. 6A is a partially enlarged view of FIG. 6.
Figure 6B:
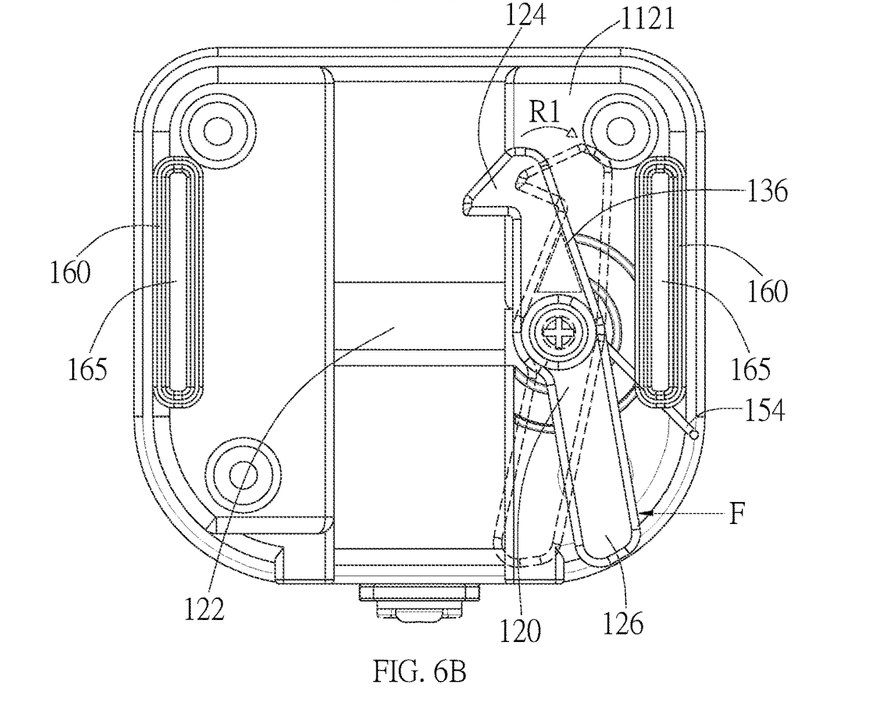
FIG. 6B is a schematic view showing the status of the second engaging portion of the battery unit of FIG. 6.

As shown in FIG. 6 and FIG. 6A, when the lock device 220 is changed from the locked state to the unlocked state, the linking shaft 224 moves (or retreats) toward the lock body 222 to drive the holding member 210 to move along the disengagement direction D1 away from the first engaging portion 122, so as to disengage from the first engaging portion 122. In other words, when the holding member 210 and the first engaging portion 122 relatively move away from each other along the disengagement direction D1, the battery unit 10 is allowed to move along the detachment direction D2 from the first position to the second position at which the holding member 210 engages with the second engaging portion 124. For example, when the holding member 210 and the first engaging portion 122 are disengaged from each other, the battery unit 10 can move downward relative to the battery holding unit 20 due to gravity (and the restoring force of the resilient member 240) and is held at the second position by the second engaging portion 124 engaging with the holding member 210. Specifically, the second engaging portion 124 engages with the interfering portion 212 from the lateral side of the extending direction of the interfering portion 212, so that the thickness of the second engaging portion 124 in the disengagement direction D1 can be modified according to practical applications to effectively reduce the engaging space between the battery unit 10 and the battery holding unit 20. In this embodiment, as shown in FIG. 6 and FIG. 6A, when the holding member 210 disengages from the first engaging portion 122, the deformed resilient member 240 can provide the restoring force (e.g. elastic force) to facilitate the movement of the battery unit 10 along the detachment direction D2 toward the second position, and the second engaging portion 124 engages with the holding member 210. When the battery unit 10 is held at the second position, the second engaging portion 124 is allowed to rotate along the surface 1121. Specifically, as shown in FIG. 6A and FIG. 6B, when the battery unit 10 is held at the second position, the user can exert the force F on the operation portion 126, so that the operation portion 126 is operated under the force F to rotate the movable member 120, and the second engaging portion 124 rotates along with the movable member 120 to disengage from the holding member 210. In other words, when the operation portion 126 is operated under the force F, the rotation axis of the movable member 120 is substantially parallel to the disengagement direction D1, and the movable member 120 rotates parallel to the surface 1211 along the rotation direction R1 (e.g. clockwise) to the position indicated by the dotted line, i.e., the position away from the first engaging portion 122. In this embodiment, the disengagement direction D1 is substantially perpendicular to the detachment direction D2. In other words, the disengagement direction D1 and the detachment direction D2 can be two orthogonal directions, but not limited thereto. In other embodiments, the disengagement direction D1 and the detachment direction D2 may include an angle larger than or smaller than 90 degrees. Moreover, the restriction portion 136 can be disposed in the overlapping area of the movable member 120 indicated by the solid line and the movable member 120 indicated by the dotted line to restrict the rotation range of the movable member and to avoid excessive rotation of the movable member 120 from over-rotating due to excessive force F.

Figure 7A:
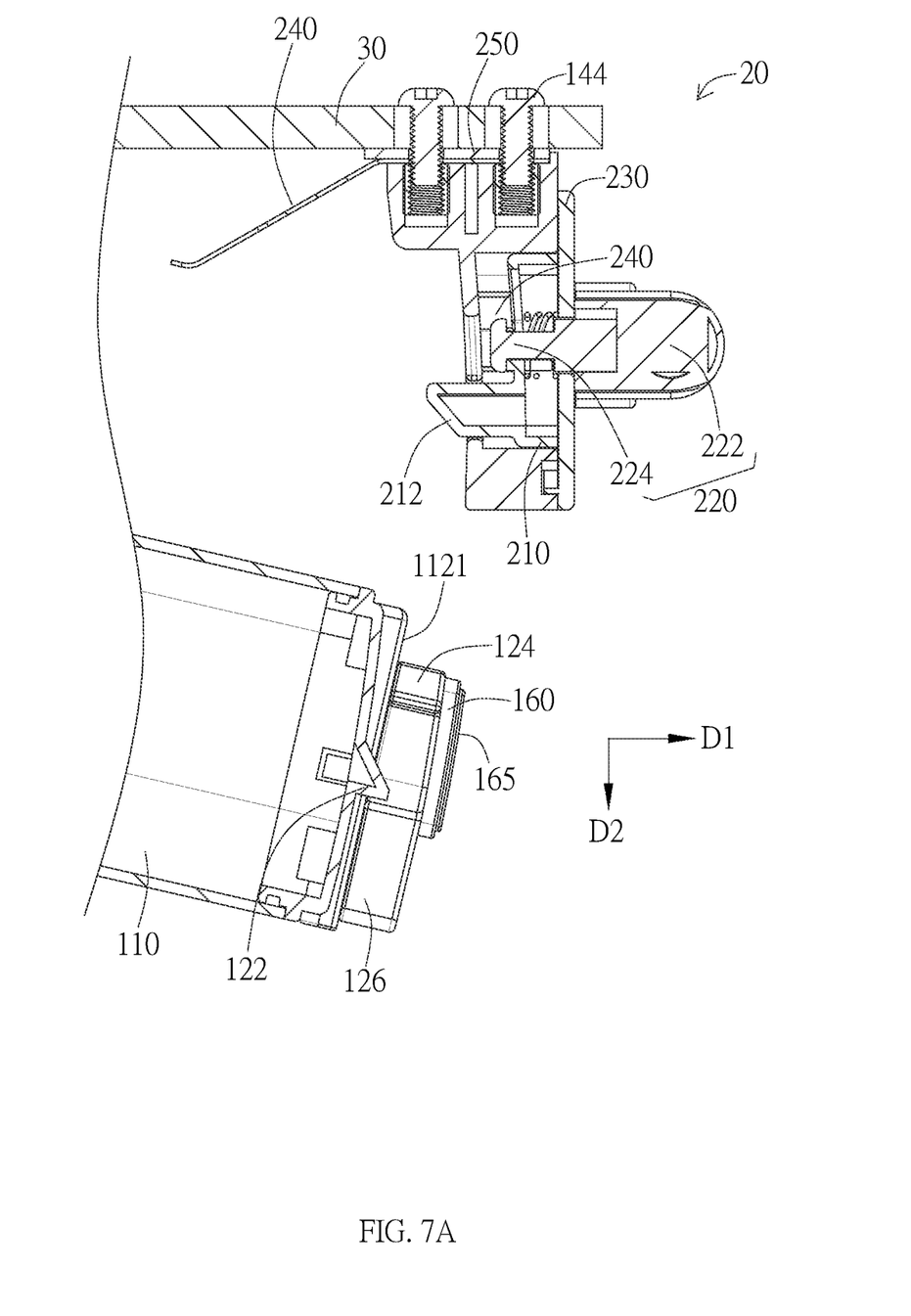
FIG. 7A is a partially enlarged view of FIG. 7.
Figure 7B:
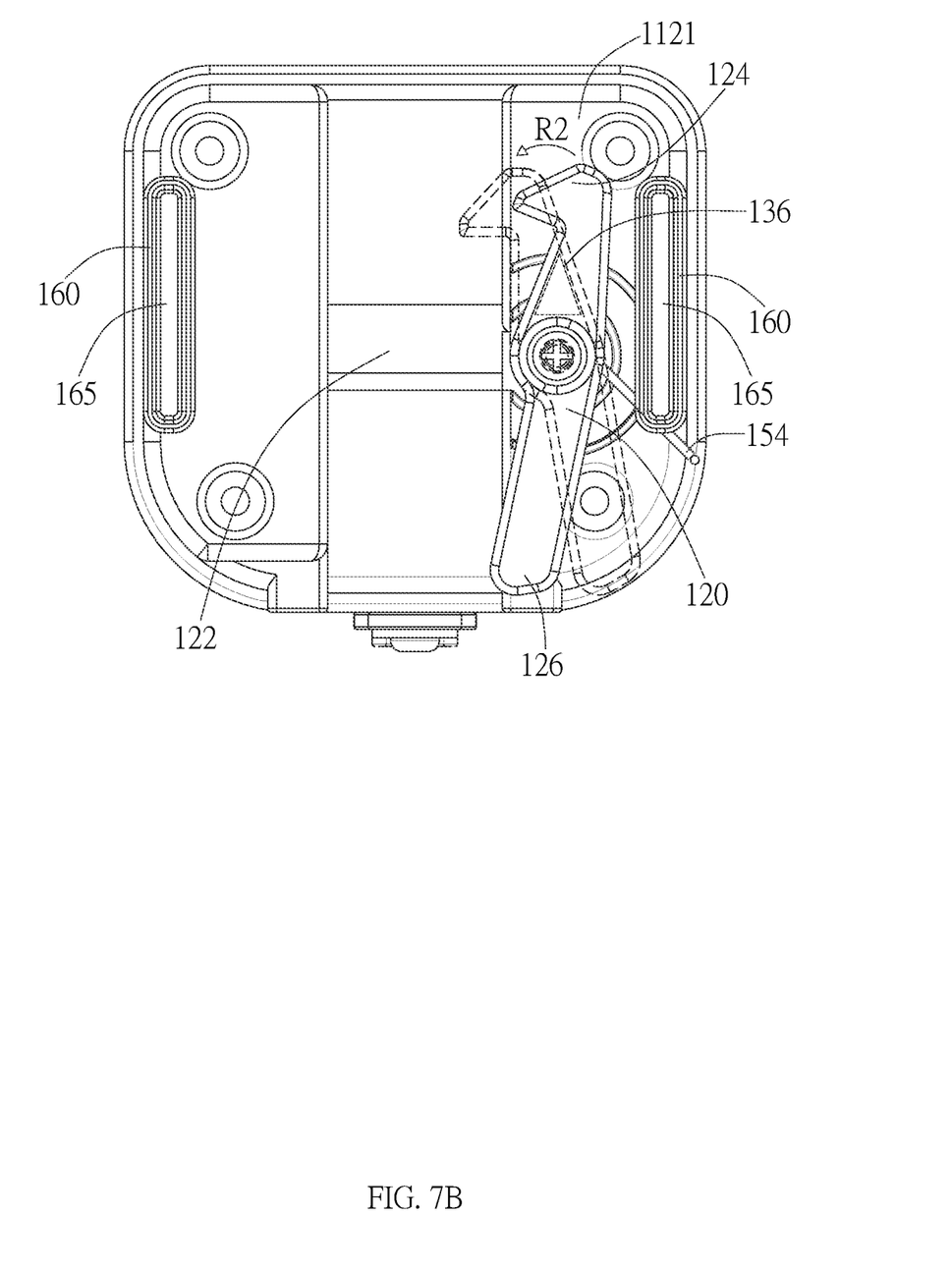
FIG. 7B is a schematic view showing the status of the second engaging portion of the battery unit of FIG. 7.

As shown in FIG. 7 and FIG. 7A, the operation portion 126 is operated under the force to rotate the movable member 120 and to drive the second engaging portion 124 to disengage from the holding member 210. The battery unit 10 is again allowed to move relative to the battery holding unit 20 along the detachment direction D2, such as move downward due to gravity (or the restoring force of the resilient member 240), to be removed from the battery holding unit 20 and the connector 40. As shown in FIG. 7B, when the battery unit 10 is removed from the battery holding unit 20 and the force F is released, the torsion spring 150 can provide the restoring force to drive the movable member 120 to rotate parallel to the surface 1121 in a reversed direction R2 (e.g. counterclockwise) to the position indicated by the dotted line, i.e. the same position of FIG. 5, which is closer to the first engaging portion 122.

Moreover, when the lock device 220 is set in the unlocked state, by operating in a reverse sequence according to FIG. 5 to FIG. 7, the battery unit 10 can be held or mounted on the battery holding unit 20. Specifically, the user can exert the external force F on the operation portion 126 to make the second engaging portion 124 move away from the interfering portion 212 (i.e., away from the first engaging portion 122) and push the battery unit 10 along the mounting direction (i.e., a direction reverse to the detachment direction D2), so that the battery unit 10 can be held by the battery holding unit 20 and electrically connected to the connector 40.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A battery assembly, comprising:
 a battery unit comprising a battery, a first engaging portion, and a second engaging portion, the first engaging portion and the second engaging portion disposed on an end portion of the battery, the second engaging portion being rotatable along a surface of the end portion, wherein a rotation axis of the second engaging portion is substantially parallel to a disengagement direction; and
 a battery holding unit, the battery unit removably held by the battery holding unit, the battery holding unit comprising a holding member, the holding member configured to engage with the first engaging portion to hold the battery unit at a first position or to engage with the second engaging portion to hold the battery unit at a second position,
 wherein when the holding member and the first engaging portion relatively move away from each other along the disengagement direction, the battery unit moves along a detachment direction from the first position to the second position at which the same holding member engages with the second engaging portion, and the second engaging portion is allowed to rotate along the surface of the end portion to disengage from the holding member, so that the battery unit moves again along the detachment direction to be removed from the battery holding unit.

2. The battery assembly of claim 1, further comprising a lock device, wherein the lock device is disposed on the battery holding unit to couple with the holding member; when the lock device is in a locked state, the holding member and the first engaging portion are immovable relative to each other to maintain engaging with each other; when the lock device is changed from the locked state to an unlocked state, the holding member moves along the disengagement direction to disengage from the first engaging portion.

3. The battery assembly of claim 2, wherein the battery unit comprises a movable member; the second engaging portion is disposed at one end of the movable member; an operation portion is disposed at the other end of the movable member opposite to the second engaging portion; the operation portion is operated to rotate the movable member, so that the second engaging portion moves away from the holding member to disengage from the holding member.

4. The battery assembly of claim 3, wherein the battery unit further comprises a positioning portion disposed on the end portion; the movable member is rotatably positioned on the positioning portion.

5. The battery assembly of claim 4, wherein the battery unit further comprises a torsion spring positioned between the positioning portion and the movable member, so that when no external force is exerted on the operation portion, the second engaging portion is maintained close to the first engaging portion; when the operation portion is operated under the external force, the second engaging portion rotates away from the first engaging portion.

6. The battery assembly of claim 5, wherein the battery unit has a positioning hole on the end portion; a first extension end of the torsion spring is inserted into the positioning hole, and a second extension end of the torsion spring interferes with the end portion.

7. The battery assembly of claim 4, wherein the battery unit has a restriction portion disposed on the end portion; when the movable member rotates, the restriction portion restricts rotation of the movable member.

8. The battery assembly of claim 7, wherein the restriction portion is an angular block with two adjacent sides; when the movable member is positioned on the positioning portion, the movable member covers the angular block.

9. The battery assembly of claim 1, wherein the battery unit further comprises a protrusion portion disposed on the end portion; the protrusion portion protrudes toward the battery holding unit to define a space for accommodating the second engaging portion on the end portion.

10. The battery assembly of claim 9, wherein the battery unit further comprises a cushion member disposed on the protrusion portion and configured to contact the battery holding unit.

11. The battery assembly of claim 1, further comprising a resilient member disposed on the battery holding unit, wherein when the engaging member disengages from the first engaging portion or the second engaging portion, the resilient member provides a restoring force to push the battery unit to move along the detachment direction.

12. The battery assembly of claim 11, further comprising a bracket and a pad, wherein the battery holding unit is mounted on the bracket, and the pad is disposed between the bracket and the resilient member to define a distance between the battery holding unit and the bracket.

* * * * *